United States Patent Office 2,718,681
Patented Sept. 27, 1955

2,718,681
METHOD AND COMPOSITIONS FOR THE PRODUCTION OF CORES FOR USE IN METAL CASTING

Claude Albert Abbs Rayner, Duxford, and Frank Bird, Little Shelford, England, assignors to Ciba Limited, Basel, Switzerland, a Swiss joint-stock company No Drawing. Application November 26, 1952, Serial No. 322,794

Claims priority, application Great Britain November 28, 1951

9 Claims. (Cl. 22—194)

This invention relates to improvements in compositions for the production of cores for use in metal casting.

In the casting of hollow metal objects it is necessary to insert a core in the mould, which core, during the pouring of the molten metal, occupies the final hollow space. This core is usually made of sand having the grains bound together by means of a substance, usually of organic nature, capable of decomposition at the metal-pouring temperature. Common examples of organic binders include drying oils such as linseed oil and thermosetting synthetic resin solutions, for example, those of the urea-formaldehyde, melamine-formaldehyde and phenol-formaldehyde types. It is common practice to apply heat to accelerate the "drying" of linseed oil and the "curing" of the synthetic resins. The amount of synthetic resin added usually varies between about ½ part and 3 parts (calculated as dry resin) for each 100 parts of dry sand. Furthermore, since a mixture of sand and resin has little green strength ("green strength" is the strength before the core is heated to "cure" the resin), it is necessary to add starch or a similar cereal-binder to impart this property. (The term "cereal-binder" is intended to mean a cereal, usually starch or dextrin, mixed with an appropriate amount of water).

As a general rule the synthetic resin corebinders are used in aqueous colloidal solution, but certain resins may be used in solution in the lower alcohols or ketones or in mixtures of these and water. These colloidal solutions, when used as corebinders, suffer from certain disadvantages the most important of which are:

(a) On exposure to the air, as occurs during the hand-making of cores, a mixture of sand, starch and resin solution quickly loses solvent, for example, water, by evaporation; this is particularly emphasised when certain resins are used in conditions of low atmospheric humidity. On "drying-out," the sand-mix loses the properties of plasticity and cohesion, and lack of cohesion makes it difficult to mould the material into a particular shape and, therefore, it may not readily reproduce the pattern of the core-box in which it is moulded. Furthermore, cores made from such a sand-mix may be friable after the resin has cured.

(b) The average mixture of sand and synthetic resin binder exhibits pronounced stickiness and this property is accentuated by the incorporation of a cereal binder. Where cores are made by hand it will be appreciated that a sticky mix is objectionable to handle and slows down the rate of production. Where cores are made by machine, freedom from stickiness is usually essential to their satisfactory operation.

(c) The amount of heat generated during the mixing of sand and a synthetic resin core binder is greater than when a linseed oil binder is used. The higher temperature increases the rate of evaporation of water and other volatile solvent.

(d) In the making of cores by hand, there is, in some cases, a risk of dermatitis with certain operatives owing to the presence of free formaldehyde. Furthermore, gaseous formaldehyde, a nose and eye irritant, is frequently evolved in undesirably large amounts from synthetic resin/sand mixes, particularly those using a urea-formaldehyde resin.

The present invention is based on the observation that all four of these particular disadvantages may be largely overcome by using as corebinder a resin emulsion having the hydrophilic component as the disperse phase and the hydrophobic component as the continuous phase.

The manner in which it would appear that the four disadvantages are overcome is detailed below:

A. Instead of water or other hydrophilic solvent as the continuous phase, the use of an oil of low volatility as hydrophobic medium reduces loss by evaporation, since the oil is not itself influenced by atmospheric humidity and protects the aqueous phase from direct contact with the atmosphere. This protective-effect also reduces the loss of solvent by evaporation during the course of mixing the emulsion and sand.

B. The use of an emulsified resin imparts a somewhat oily and substantially non-sticky feel to a mixture of resin, cereal, water and sand.

C. The oil being the continuous phase in the emulsion it provides lubrication between the grains of sand during the process of mixing, and the amount of frictional heat is therefore reduced; this also results in a smaller loss of solvents by evaporation.

D. Protection against the risk of dermatitis is afforded by the film of oil surrounding each particle of resin solution; although a small amount of formaldehyde diffuses through the skin of oil, substantial protection is afforded by the oil which inevitably coats the hands of the persons using the mixed core-sand, thereby acting as a barrier.

According to one feature of the present invention therefore, a composition, for the production of cores for use in metal casting, is made with the application as corebinder of an emulsion comprising a hydrophilic solution of a thermo-setting resin emulsified in a suitable hydrophobic medium.

As resins, the synthetic resins set forth above may be employed, including cresol-formaldehyde and thiourea-formaldehyde resins. A cereal corebinder may also be present.

According to a further feature of the invention, instead of using a hydrophilic solution of a preformed resin, a solution of a resin-forming reaction product, such as a methylol compound of urea or melamine, especially dimethylol urea, may be employed, the resin being afterwards formed in the core mix made with the use of a corresponding emulsion containing the said resin-forming reaction product.

The said methylol compounds have a limited solubility in water and, in order to avoid crystallisation on cooling, it would be necessary, in forming the corresponding emulsions, to use very dilute solutions thereof. However the presence of considerable quantities of water is undesirable, particularly from the point of view of transport and transport costs.

Thus according to a still further feature of the invention, instead of a homogeneous solution of the resin-forming reaction product, there is used in the formation of the emulsion a solution containing suspended crystals of the said reaction product. The emulsion system produced is one in which some crystals are suspended in the disperse phase of the emulsion. This condition does not adversely affect the performance as a corebinder, it merely makes the emulsions appear rather coarse.

Sand cores made according to the invention, with a resin emulsion of the water-in-oil type, require heating at elevated temperatures in order to crack the emulsion and cure the resin, thus forming a strong solid body comprising grains of sand embedded in a network of resin.

At elevated temperature also the methylol compound, for example, dimethylol urea, melts and splits off water and is converted to a resin, which, like the emulsified colloidal resin solutions, on further heating becomes insoluble and infusible.

The preparation of emulsions of these resinous or potentially resin-forming compounds is carried out according to methods commonly used in emulsion technology. A wide range of surface active agents and stabilisers have been found suitable; in many cases it has been found unnecessary to use a colloid mill or a homogeniser, simple agitation by stirring being sufficient.

No difficulty has been experienced in emulsifying aqueous solutions or dispersions of urea-formaldehyde or melamine-formaldehyde condensation products. Phenol-formaldehyde resins soluble in dilute aqueous alkalies (commonly called "water-soluble") have presented no difficulty nor have phenol and cresol-formaldehyde resins dissolved in alcohol, e. g. ethyl alcohol or acetone or mixtures of alcohol and water or acetone and water.

Hydrocarbon oils having boiling points between about 120 and 300° C., depending on the temperature at which the sand cores are to be baked, are satisfactory for use as the continuous phase.

The following examples illustrate the invention, see especially the table set forth below:

Water-in-oil type emulsions may be produced as follows:

*Resin emulsion (i)—An aqueous resin of about 45% concentration emulsified in oil*

30 parts by weight odourless kerosene
4 parts by weight "Belloid F. R." (a fatty acid ester of alkanolamine supplied by Geigy Ltd. of 46 Old Bond Street, W. 1.)
0.2 parts by weight "Nervan C. S." (a mixture of a sulphated olefine and a sulphated ester supplied by Norman Evans & Rais Ltd. of Dudely Rd., Manchester).
150 parts by weight of water
150 parts by weight of a 45% aqueous colloidal solution of a urea-formaldehyde resin.

The above are mixed in the order shown and stirring continued until a homogeneous emulsion is formed

*Resin emulsion (ii)—A reaction-product of urea and formaldehyde, comprising substantially a solution of methylol compounds of urea emulsified in oil*

191 parts by weight of a 37% w./w. aqueous solution of formaldehyde adjusted to a pH of 8 to 8.5
100 parts by weight of urea
40 parts by weight of odourless kerosene
3 parts by weight "Belloid F. R."
1 parts by weight calcium oleate
120 parts by weight of water.

The urea and formaldehyde are heated to about 90° C. to accelerate the formation of methylol urea, and then cooled to 50° C.

The "Belloid F. R.," calcium oleate, kerosene and water are emulsified by agitation at about 50° C.

The solution of urea and formaldehyde (containing some methylol compounds in solution) is then added to the water-in-oil emulsion at about 50° C. and stirring continued until a homogeneous emulsion is formed. This emulsion contains a proportion of di-methylol urea in fine-crystal form.

*Resin emulsion—G. B. Kordek Mixture (iii)—A reaction-product of urea and formaldehyde (comprising substantially a solution of methylol compounds of urea) emulsified in oil and to which a quantity of cereal binder is added*

191 parts by weight of a 37% w./w. aqueous solution of formaldehyde adjusted to a pH of 8 to 8.5
100 parts by weight of urea
40 parts by weight of odourless kerosene
3 parts by weight of "Belloid F. R."
1 parts by weight of calcium oleate.

The urea and formaldehyde are heated to about 90° C. to accelerate the formation of methylol urea, and then cooled to 50° C. The "Belloid F. R." calcium, oleate, kerosene and urea-formaldehyde solution are emulsified at about 50° C. and agitation continued until the emulsion has cooled to room temperature. It contains a proportion of dimethylol urea in fine-crystal form. 52.5 parts of cereal binder (G. B. Kordek, a proprietary brand of starch) are then wetted with 2.5 parts of odourless kerosene and mixed with 45 parts of the emulsion. This produces a material which is a reasonably free-flowing moist powder.

The product of (iii) has certain special advantages such as the convenience of handling a corebinder in solid form which on the addition of water is capable of imparting both green strength and dry strength.

*Resin emulsion (iv)—A water-miscible phenol-formaldehyde resin emulsified in oil*

12.5 parts by weight of odourless kerosene
5 parts by weight of "Prevok" a heavy metallic soap of wool-grease supplied by Croda Ltd. of Goole, Yorks.
2.5 parts by weight of calcium oleate
45 parts by weight of a 50% aqueous colloidal solution of a heat-hardenable phenol-formaldehyde resin in alkali.

The kerosene, "Prevok" and calcium oleate are heated with stirring to about 40° C. The resin also at a temperature of about 40° C., is added slowly and stirring continued until a homogeneous emulsion is obtained.

*Resin emulsion (v)—A methylol melamine emulsion*

63 parts by weight melamine.
490 parts by weight 37% w./w. aqueous formaldehyde solution.
5 parts sodium borate.
40 parts by weight odourless kerosene.
2.5 parts "Belloid F. R."
250 parts by weight water.

The melamine, formaldehyde solution and sodium borate are heated for 10 minutes at 90° C. and, at this temperature, added slowly to the odourless kerosene in which the "Belloid F. R." has been previously dissolved; the water, at a temperature of 40°–50° C., is added simultaneously.

It is necessary to maintain a temperature of 65–70° C. during emulsification, which may be carried out by use of a high-speed stirrer.

TABLE

[In parts by weight]

| | Mix No. 1 | Mix No. 2 | Mix No. 3 | Mix No. 4 | Mix No. 5 | Mix No. 6 |
|---|---|---|---|---|---|---|
| Parish's sand | 100 | 100 | 100 | 100 | 100 | 100 |
| Cereal binder (G. B. Kordek) | 2 | 2 | 1¾ | 2 | 2 | |
| Resin emulsion (i) | 3 | | | | | |
| Resin emulsion (ii) | | 2 | 2 | 1½ | 2 | |
| Resin emulsion—G. B. Kordek mixture (iii) | | | | | | 3½ |
| Water | 1¾ | 2 | 2 | 1¾ | 1½ | 3½ |
| Green Strength oz | 17 | 18 | 14 | 15 | 16 | 19 |
| Dry compression strength p. s. i | 1,286 | >1,700 | >1,700 | 1,443 | 1,355 | >1,700 |
| Dry Tensile strength p. s. i | 220 | 253 | 257 | 202 | 235 | 261 |

TABLE—Continued

|  | Mix No. 7 | Mix No. 8 | Mix No. 9 | Mix No. 10 | Mix No. 11 | Mix No. 12 | Mix No. 13 | Mix No. 14 |
|---|---|---|---|---|---|---|---|---|
| Parish's sand | | 100 | 100 | | 80 | | 100 | 100 |
| Congleton sand | 40 | | | 100 | | | | |
| Chelford sand (wet) | 60 | | | | | | | |
| Mansfield red sand | | | | | 20 | | | |
| Southport sand | | | | | | 100 | | |
| G. B. Kordek | | | 1.5 | 1.5 | 1.5 | | 1.5 | 1.5 |
| G. B. Kordek blend D | | | | | | 1.75 | | |
| Stadex 565 [1] | 1.0 | | | | | | | |
| Stadex 580 | | 1.0 | | | | | | |
| Fulbond [2] | 0.5 | | | | | | | |
| Resin emulsion (ii) | 0.8 | 1.5 | 1.5 | 2.0 | 0.5 | 1.5 | | |
| Resin emulsion (iv) | | | | | | | 1.5 | |
| Resin emulsion (v) | | | | | | | | 1.5 |
| Water | | 3.0 | 1.5 | 1.75 | 3.0 | 2.5 | 2.0 | 2.0 |
| Green permeability | ([3]) | | | | | | | |
| Green strength ........ oz | 28 | 15 | 14.5 | 28 | 48 | 21 | 14 | 15 |
| Dry compression strength ....... p. s. i | | 1,634 | 1,430 | 1,510 | 760 | 1,400 | 1,616 | 1,366 |
| Dry Tensile strength ............ p. s. i | 192 | 306 | 230 | 192 | 120 | 212 | 258 | 231 |

[1] A proprietary brand of starch.
[2] A proprietary brand of clay.
[3] 69 A. F. A. units.

The strength figures given represent the mean of six American Foundrymen's Association (A. F. A.) standard test cores.

We claim:

1. In the production of a core for use in metal casting, the steps of mixing refractory core material with an emulsion of the water-in-oil type constituted by a solution in a hydrophilic solvent, of at least one substance of the group consisting of thermo-setting resins and thermo-setting resin-forming reaction products, which solution is emulsified in a hydropobic medium, forming a core therefrom and heating the core material-emulsion mixture to crack the emulsion and cure the resin.

2. In the production of a core for use in metal casting, the steps of mixing refractory core material with an emulsion of the water-in-oil type constituted by a solution, in a hydrophilic solvent of at least one substance of the group consisting of thermo-setting resins and thermo-setting resin-forming reaction products, which solution is emulsified in a hydrocarbon oil having a boiling point between about 120° C. and about 300° C., forming a core therefrom, and heating the core material-emulsion mixture to crack the emulsion and cure the resin.

3. In the production of a core for use in metal casting, the steps of mixing refractory core material with an emulsion of the water-in-oil type constituted by a solution, in a hydrophilic solvent, of at least one methylol compound of a substance of the group consisting of urea and melamine, which solution is emulsified in a hydrocarbon oil having a boiling point between about 120° C. and about 300° C., forming a core therefrom, and heating the core material-emulsion mixture to crack the emulsion and cure the resin.

4. In the production of a core for use in metal casting, the steps of mixing refractory core material with an emulsion of the water-in-oil type constituted by a solution, in a hydrophilic solvent, of dimethylol urea, which solution is emulsified in a hydrocarbon oil having a boiling point between about 120° C. and about 300° C., forming a core therefrom, and heating the core material-emulsion mixture to crack the emulsion and cure the resin.

5. A method as claimed in claim 4, wherein the emulsion used contains crystals of dimethylol urea suspended in the disperse phase of the emulsion.

6. A method of production of a core for use in metal casting, wherein a mix is prepared comprising sand, water, a cereal binder and an emulsion of the water-in-oil type constituted by a solution, in a hydrophilic solvent of at least one substance of the group consisting of thermo-setting resins and thermo-setting resin-forming reaction products, which solution is emulsified in a hydrocarbon oil having a boiling point between about 120° C. and about 300° C., the mix is shaped to form the core and the shaped mix is heated to crack the emulsion and cure the resin.

7. A method of production of a core for use in metal casting, wherein a mix is prepared consisting of sand, water, a cereal binder and an emulsion in kerosene of an aqueous colloidal solution of a ureaformaldehyde resin, the mix is shaped to form the core and the shaped mix is heated to crack the emulsion and cure the resin.

8. A method of production of a core for use in metal casting, wherein a mix is prepared consisting of sand, water, a cereal binder and an emulsion in kerosene of an aqueous solution of at least one methylol compound of urea, which solution contains suspended crystals of dimethylol urea, the mix is shaped to form the core and the shaped mix is heated to crack the emulsion and cure the resin.

9. A method of production of a core for use in metal casting, wherein a mix is prepared consisting of sand, water, a cereal binder and an emulsion in kerosene of an aqueous colloidal solution of a heat-hardenable phenol-formaldehyde resin in alkali, the mix is shaped to form the core and the shaped mix is heated to crack the emulsion and cure the resin.

References Cited in the file of this patent

UNITED STATES PATENTS

| | | |
|---|---|---|
| 1,283,237 | Lowel | Oct. 29, 1918 |
| 2,313,674 | Salzberg | Mar. 9, 1943 |
| 2,342,642 | Cassel | Feb. 29, 1944 |
| 2,358,002 | Dearing et al. | Sept. 12, 1944 |
| 2,364,692 | Cassel | Dec. 12, 1944 |
| 2,422,118 | Meyer | June 10, 1947 |

FOREIGN PATENTS

| | | |
|---|---|---|
| 894,793 | France | Mar. 20, 1944 |